United States Patent
Engelen et al.

(10) Patent No.: US 9,807,824 B2
(45) Date of Patent: *Oct. 31, 2017

(54) METHODS AND APPARATUS FOR SENSING LIGHT OUTPUT AND CONTROLLING LIGHT OUTPUT

(71) Applicant: PHILIPS LIGHTING HOLDING B.V., Eindhoven (NL)

(72) Inventors: Dirk Valentinus René Engelen, Heusden-Zolder (BE); Dzmitry Viktorovich Aliakseyeu, Eindhoven (NL); Bartel Marinus Van De Sluis, Eindhoven (NL); Tatiana Aleksandrovna Lashina, Eindhoven (NL); Tim Dekker, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/549,932

(22) Filed: Nov. 21, 2014

(65) Prior Publication Data

US 2015/0102732 A1  Apr. 16, 2015

Related U.S. Application Data

(62) Division of application No. 14/365,243, filed as application No. PCT/IB2012/057027 on Dec. 6, 2012, now Pat. No. 9,510,399.

(Continued)

(51) Int. Cl.
*H05B 33/08* (2006.01)
*H05B 37/02* (2006.01)
*G06F 3/042* (2006.01)

(52) U.S. Cl.
CPC .......... *H05B 33/08* (2013.01); *G06F 3/0421* (2013.01); *H05B 33/089* (2013.01);
(Continued)

(58) Field of Classification Search
CPC ....................... H05B 33/0851; H05B 37/0227
(Continued)

(56) References Cited

U.S. PATENT DOCUMENTS

| 6,504,605 B1 | 1/2003 | Pedersen et al. | |
|---|---|---|---|
| 2003/0001807 A1* | 1/2003 | Debiez | G11B 15/68 345/82 |

(Continued)

FOREIGN PATENT DOCUMENTS

| CN | 101479966 A | 7/2009 |
|---|---|---|
| JP | 10317850 A | 12/1998 |

(Continued)

OTHER PUBLICATIONS

Sandeep Gogineni et al, "Compressed LED Illumination Sensing", IEEE Signal Processing Letters, vol. 18, No. 10, Oct. 2011, pp. 587-590.

*Primary Examiner* — Dedei K Hammond
(74) *Attorney, Agent, or Firm* — Meenakshy Chakravorty (57) ABSTRACT

Methods and apparatus for lighting control. In some embodiments methods and apparatus are provided that sense a low lighting condition at a location and direct light toward that location after detection of the low lighting condition. In some embodiments apparatus are provided that include a plurality of networked LEDs. Some of the LEDs may be illuminated in response to sensed light conditions at certain locations.

20 Claims, 8 Drawing Sheets

Related U.S. Application Data (60) Provisional application No. 61/570,343, filed on Dec. 14, 2011.

(52) U.S. Cl.
CPC ..... *H05B 33/0851* (2013.01); *H05B 33/0857* (2013.01); *H05B 33/0869* (2013.01); *H05B 37/029* (2013.01); *H05B 37/0218* (2013.01); *H05B 37/0227* (2013.01)

(58) Field of Classification Search
USPC .......................................................... 315/151
See application file for complete search history.

(56) References Cited

U.S. PATENT DOCUMENTS

| | | | |
|---|---|---|---|
| 2003/0185009 A1 | 10/2003 | Walters | |
| 2005/0168984 A1* | 8/2005 | Ossevoort et al. | 362/234 |
| 2013/0070258 A1* | 3/2013 | Morbee et al. | 356/614 |

FOREIGN PATENT DOCUMENTS

| | | | |
|---|---|---|---|
| JP | 2010510621 A | | 4/2010 |
| JP | 2011222429 A | | 11/2011 |
| WO | 2003059016 A1 | | 7/2003 |
| WO | WO2008/001259 | * | 1/2008 |
| WO | 2009004539 A1 | | 1/2009 |
| WO | WO2009/004539 | * | 1/2009 |
| WO | 2011151232 A1 | | 12/2011 |

\* cited by examiner

METHODS AND APPARATUS FOR SENSING LIGHT OUTPUT AND CONTROLLING LIGHT OUTPUT

CROSS REFERENCE TO PRIOR APPLICATIONS

This application is a divisional of co-pending U.S. Ser. No. 14/365,243, filed Jun. 13, 2014, which is a U.S. National Stage Application under 35 U.S.C. §371 of International Application No. PCT/IB2012/057027, filed on Dec. 6, 2012, which claims the benefit of U.S. Provisional 61/570,343, filed Dec. 14, 2011. These prior applications hereby are incorporated herein by reference.

TECHNICAL FIELD

The present invention is directed generally to lighting control. More particularly, various inventive methods and apparatus disclosed herein relate to sensing and controlling light output.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects.

In lighting systems such as those that include LED-based light sources, it is desirable to have control over one or more light sources of the lighting system. Control of one or more light sources enables specification of lighting parameters for an environment. For example, a user may directly specify one or more lighting parameters of one or more light sources. Also, for example, the user may specify the effect that is desired at one or more locations in the environment and lighting parameters of one or more light sources may be derived based on the desired effects. For example, relations between light sources of a lighting system and an environment may be present within a computer-aided design (CAD) model or a measurement model. By describing the desired effect at a location in the environment, the lighting system may derive the lighting control parameters for light sources based utilizing the CAD model to identify the light sources that have an effect at that location, to identify the distance between the light sources and the location, and to identify known variables of those light sources.

Although a CAD model or measurement model may be utilized to specify lighting effects, they may suffer from one or more drawbacks. For example, when using CAD models, any changes in the environment and/or any redirection of luminaires would have to be applied in the CAD model to provide updated lighting effects. Such updating of the CAD model may be burdensome and/or expensive. Also, for example, when using measurement models, measurement equipment would need to remain present in the environment to provide updated measurements following changes in the environment. Such measurement equipment may be expensive and/or burdensome to operate. Moreover, exiting lighting systems do not satisfactorily locate and/or track an item within an environment that is to be illuminated.

Thus, there is a need in the art to provide methods and apparatus that enable control of light output and that optionally overcome one or more drawbacks of existing lighting systems.

SUMMARY

The present disclosure is directed to inventive methods and apparatus for lighting control. More particularly, various inventive methods and apparatus disclosed herein relate to sensing and directing light output. For example, in some embodiments methods and apparatus are provided that sense a low lighting condition at a location and direct light toward that location after detection of the low lighting condition. Also, for example, in some embodiments, methods and apparatus are provided that include a plurality of networked LEDs. The networked LEDs include LEDs that have light-generating and/or light-sensing capabilities. Some of the LEDs may be illuminated in response to sensed light conditions at other of the LEDs.

Generally, in one aspect, a method of directing light toward a blocked light-sensing surface is provided and includes the steps of: associating a first sensor of a light-sensing surface with at least one of a plurality of light-generating LEDs; associating a second sensor of the light-sensing surface with at least one of the plurality of light-generating LEDs; monitoring a first sensor light intensity of the first sensor and a second sensor light intensity of the second sensor; detecting a first sensor blocked condition at the first sensor when the first sensor light intensity is below a first sensor threshold level; generating a first light output from at least one of the light-generating LEDs associated with the first sensor when the first sensor is in the first sensor blocked condition; detecting a second sensor blocked condition at the second sensor when the second sensor light intensity is below a second sensor threshold level; and generating a second light output from at least one of the light-generating LEDs associated with the second sensor when the second sensor is in the second sensor blocked condition.

In some embodiments, the first sensor is a light-sensing LED.

In some embodiments, the light-generating LEDs are on a second surface facing the light-sensing surface.

In some embodiments, at least one of the light-generating LEDs is on the light-sensing surface.

In some embodiments, the light-generating LEDs include a first light-generating LED on the light-sensing surface and a second light-generating LED on a second surface facing the light-sensing surface.

In some embodiments, at least one of the light-generating LEDs associated with the first sensor is unique from the light-generating LEDs associated with the second sensor. Also, associating each of the first sensor and the second sensor with the light-generating LEDs includes sequentially activating each of the light-generating LEDs and monitoring the light intensity at the first sensor and the second sensor during activation of each of the light-generating LEDs.

In some embodiments, the method further includes the step of associating a light intensity contribution of each of the light-generating LEDs with each of the first sensor and the second sensor. The method may further include the step of associating directional information of each of the light-generating LEDs with each of the first sensor and the second sensor. In some versions of those embodiments the directional information is derived from a computer-aided-design model.

Generally, in another aspect, a method of directing light output of LEDs in a LED network is provided and includes the steps of: activating each of a plurality of light-generating LEDs in a calibration mode; measuring a light intensity at each of a plurality of light-sensing nodes during the calibration mode to determine a light intensity contribution of each of the light-generating LEDs at each of the light-sensing nodes; monitoring the light intensity at each of the plurality of light-sensing nodes during an active mode; detecting a blocked condition at a blocked node of the light-sensing nodes when the light intensity at the blocked node is below a threshold level in the active mode; and activating at least one light-generating LED in response to detecting the blocked condition, wherein the activated at least one light-generating LED provided at least a minimum light intensity contribution at the blocked node during the calibration mode.

In some embodiments, the blocked node includes at least one light-sensing LED. In some versions of those embodiments the method further includes selectively generating a light output with the light-sensing LED when the light-sensing LED is not in the blocked condition.

In some embodiments, the blocked node includes a plurality of light-sensing LEDs. The step of activating each of the plurality of light-generating LEDs in a calibration mode includes sequentially activating each of the light-generating LEDs.

In some embodiments, the blocked node includes at least one of the light-generating LEDs. In some versions of those embodiments the light-generating LED of the blocked node does not generate a light output when in the blocked condition.

Generally, in another aspect, a method of directing light output of LEDs in a LED network is provided and includes the steps of: associating directional information and intensity information of a plurality of light-generating LEDs with a plurality of light-sensing nodes; associating a directional parameter with each of the light-sensing nodes; monitoring a light intensity at each of the light-sensing nodes; detecting a blocked condition at a blocked node of the light-sensing nodes when the light intensity is below a threshold level at the blocked node; activating, in response to the blocked condition, at least one of the light-generating LEDs associated with the blocked node that has the directional information corresponding to the directional parameter of the blocked node.

In some embodiments, the blocked node includes at least one light-sensing LED.

In some embodiments, only those light-generating LEDs that have the directional information corresponding to the directional parameter of the blocked node are activated in response to the blocked condition.

Generally, in another aspect, a plurality of networked LEDs are provided that include a first LED configured to selectively generate a light output therefrom and a second LED configured to selectively sense a light intensity level thereat. The light output of the first LED affects the light intensity at the second LED when no obstructions are present therebetween. The first LED is illuminating in the direction of the second LED in response to the second LED sensing the light intensity level thereat below a threshold value.

In some embodiments, the second LED is additionally configured to selectively generate a second light output therefrom and the first LED is additionally configured to sense a second light intensity level thereat. The second light output of the second LED affects the second light intensity at the first LED when no obstructions are present therebetween In some embodiments, the first LED is on a first surface and the second LED is on a second surface facing the first surface. In other embodiments, the first LED is on a first surface and the second LED is also on the first surface.

As used herein for purposes of the present disclosure, the term "LED" should be understood to include any electroluminescent diode or other type of carrier injection/junction-based system that is capable of generating radiation in response to an electric signal and/or acting as a photodiode. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/ housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

In lighting systems, it is desirable to have control over one or more light sources of the lighting system. Relations between light sources of a lighting system and an environment may be present within a computer-aided design (CAD) model or a measurement model. By describing the desired effect at a location in the environment, the lighting system may derive the lighting control parameters for light sources based on identification of various parameters within the CAD model or measurement model. Although a CAD model or measurement model may be utilized to specify lighting effects, they may suffer from one or more drawbacks. For example, changes in the environment and/or any redirection of luminaires would have to be manually applied in a CAD model to provide updated lighting effects. Also, for example, when using measurement models, measurement equipment would need to remain present in the environment to provide updated measurements following changes in the environment. Moreover, existing lighting systems do not satisfactorily locate and/or track an item within an environment that is to be illuminated Thus, there is a need in the art to provide methods and apparatus that enable control of light output and that optionally overcome one or more drawbacks of existing lighting systems.

In that regard, Applicants have recognized and appreciated that it would be beneficial to provide various inventive methods and apparatus related to sensing and control light output.

In view of the foregoing, various embodiments and implementations of the present invention are directed to lighting control.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, aspects of the methods and apparatus disclosed herein are described in conjunction with control of a lighting system having an upper surface and opposed lower surface, each provided with LEDs. However, one or more aspects of the methods and apparatus described herein may be implemented in other surface configurations such as, for example, surfaces that are not directly opposed to one another, multi-planar surfaces, more than two surfaces, and/or surfaces that include non-LED light sensors and/or non-LED light sources. In many implementations the methods and apparatus described herein may be implemented in complex environments across a multitude of surfaces. Implementation of the one or more aspects described herein in alternatively configured environments is contemplated without deviating from the scope or spirit of the claimed invention.

Figure 1:
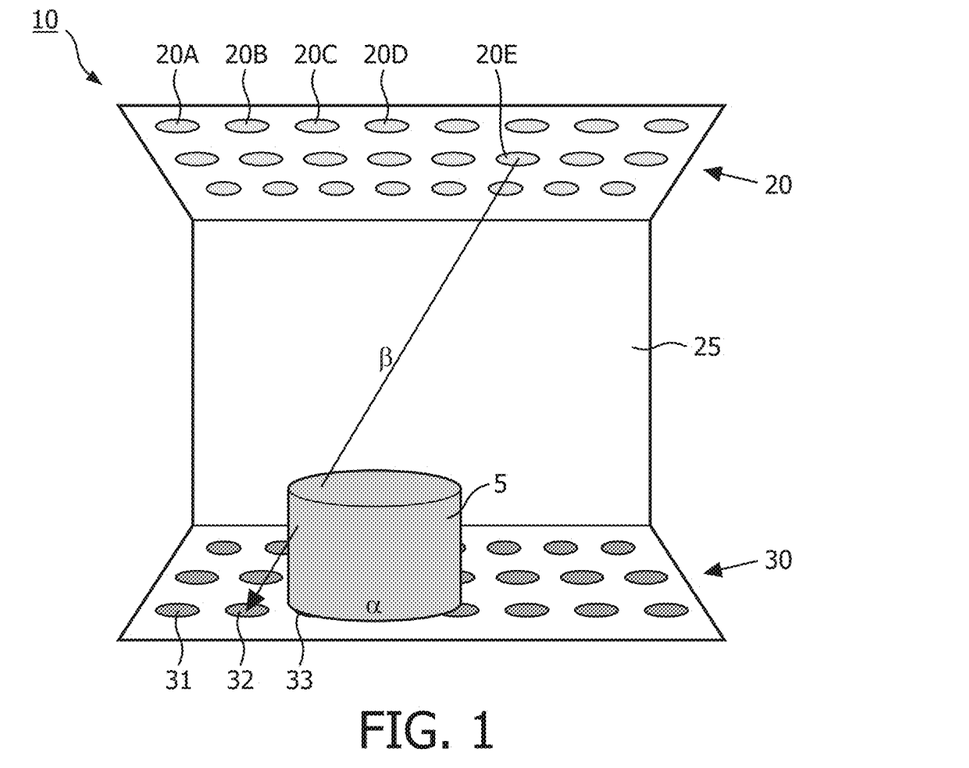
FIG. 1 illustrates a first embodiment of a LED-based lighting system having an upper surface of LEDs and a lower surface of LEDs; an object is illustrated atop a portion of the lower surface of LEDs.
Figure 1A:
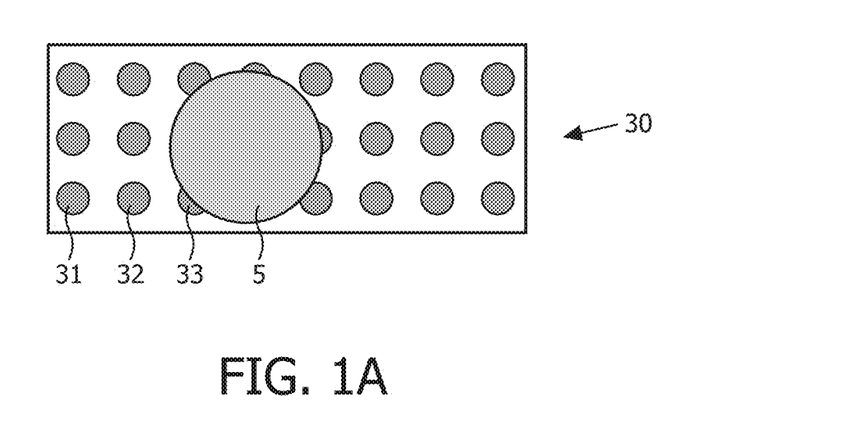
FIG. 1A illustrates a top view of the lower surface of LEDs of FIG. 1 with the object illustrated in the same position as it is in FIG. 1.
Figure 2:
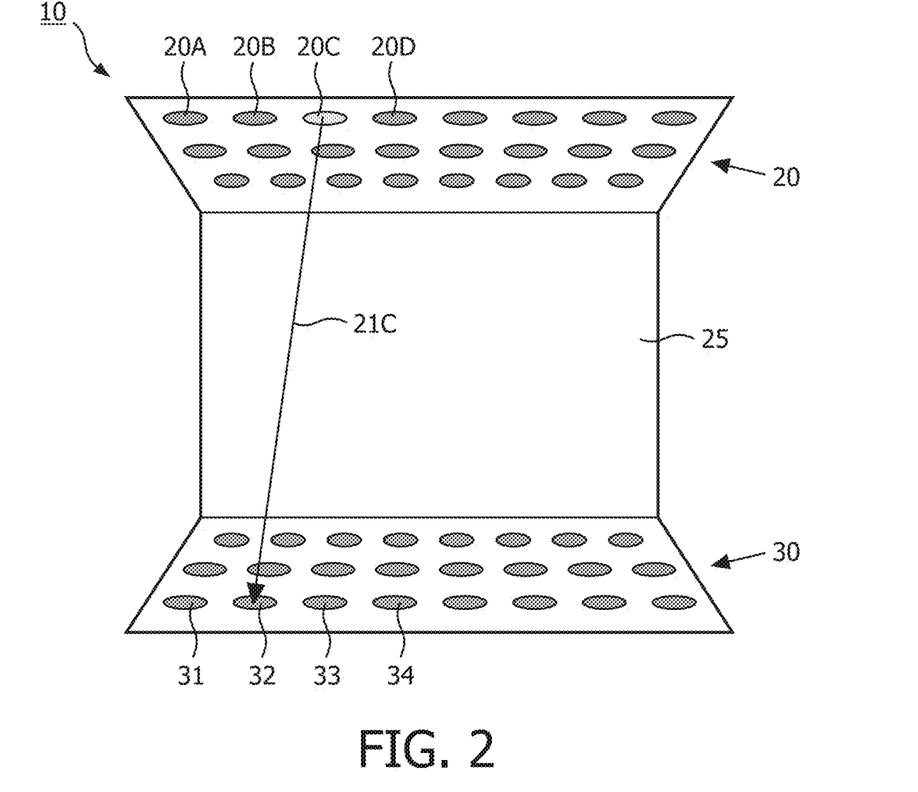
FIG. 2 illustrates the first embodiment of a LED-based lighting system of FIG. 1 with the object of FIG. 1 removed.
Figure 2A:
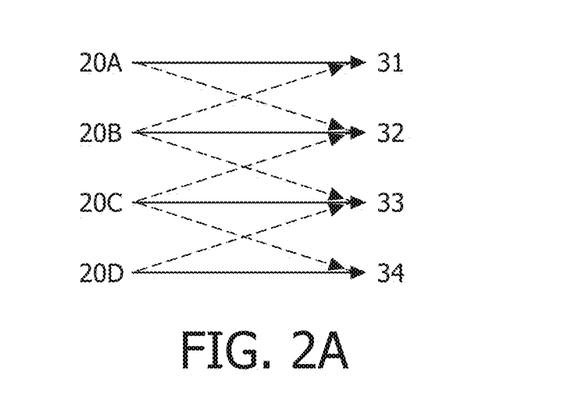
FIG. 2A illustrates the effect of light output from certain LEDs of the upper surface on certain LEDs of the lower surface of the LED-based lighting system of FIG. 1.
Figure 2B:
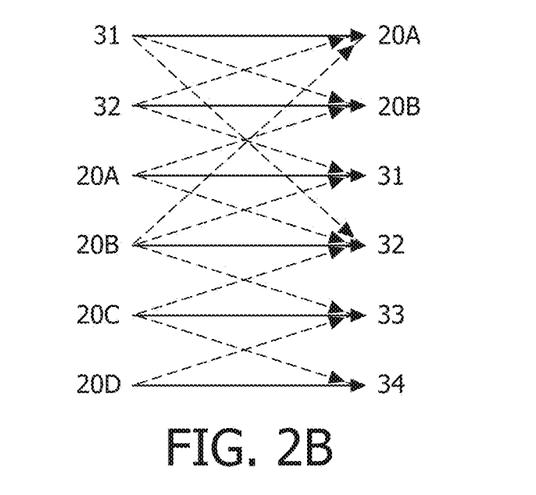
FIG. 2B illustrates the effect of light output from certain LEDs of the upper surface and lower surface on certain LEDs of the upper surface and lower surface of the LED-based lighting system of FIG. 1.
Figure 2C:
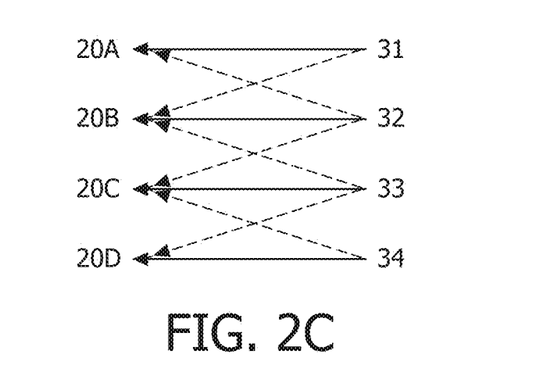
FIG. 2C illustrates which LEDs of the upper surface are influential for certain LEDs of the lower surface of the LED-based lighting system of FIG. 1.
Figure 2D:
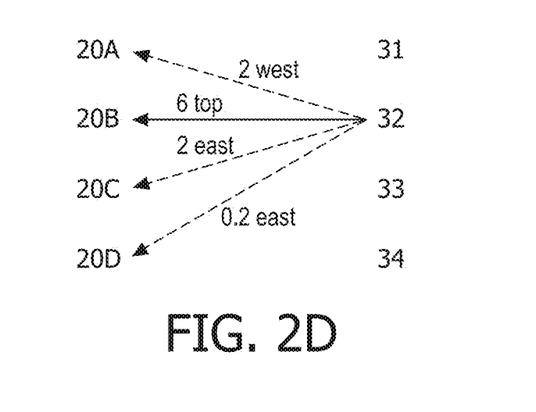
FIG. 2D illustrates the influential LEDs for one LED of the lower surface on certain LEDs of the upper surface of the LED-based lighting system of FIG. 1 and includes geometry information.

Referring to FIGS. 1 through 2D, aspects of a first embodiment of a LED-based lighting system 10 are illustrated. The LED-based lighting system 10 includes an upper surface of LEDs 20 and a lower surface of LEDs 30. A wall 25 is illustrated extending between the upper surface of LEDs 20 and the lower surface of LEDs 30. A cylindrical object 5 is illustrated atop a portion of the lower surface of LEDs 30 in FIGS. 1 and 1A. FIG. 1A illustrates a top view of the lower surface of LEDs 30 with the object 5 illustrated in the same position as it is in FIG. 1. The LEDs in the upper surface of LEDs 20 are all generating light output in FIG. 1 of a level less than full light output, as generally indicated by the light gray shading of the LEDs. The LEDs in the lower surface of LEDs 30 are all off, as generally indicated by the black shading of the LEDs. The LEDs in the lower surface of LEDs 30 are acting as light-sensing LEDs. That is, the LEDs in the lower surface of LEDs 30 are acting as photodiodes to detect light output. As described herein, in some embodiments all LEDs may selectively act as either light-generating LEDs or light-sensing LED. Also, in some embodiments one or more LEDs may be dedicated to being either a light-generating LED or a light-sensing LED. Also, in some embodiments non-LED based light sensors may be provided in addition to or in lieu of light-sensing LEDs. Also, in some embodiments non-LED based light sources may be provided in addition to or in lieu of light-generating LEDs The LEDs that are fully or partially beneath the object 5, such as LED 33, can detect that they are in a blocked condition. For example, if the object 5 is opaque or substantially light blocking, the LEDs that are wholly beneath the object 5 may sense a light output level indicative of being in a fully blocked condition and LEDs such as LED 33 may sense a light output level indicative of being in a partially blocked condition. Also, for example, if the object 5 is transparent or semi-transparent but still blocks or redirects some light output, the LEDs that are beneath the object 5 may sense a light output level indicative of being in a partially blocked condition and LEDs such as LED 33 may also sense a light output level indicative of being in a partially blocked condition.

In response to such LEDs sensing they are in a blocked condition, one or more controllers may communicate with one or more LEDs of upper surface of LEDs 20 to request altered light output characteristics directed toward such blocked LEDs to thereby illuminate the object 5 with such characteristics. For example, a controller may communicate with one or more light emitting LEDs 20A-E to have them increase their light output intensity to thereby increase illumination levels on the object 5. Also, for example, a controller may communicate with one or more light emitting LEDs 20A-E to have them alter their light output color to thereby alter the color of light output on the object 5. Also, for example, a controller may communicate with one or more light emitting LEDs 20A-E to have them alter their beam width and/or beam direction. A controller may be associated with a single LED or multiple LEDs. For example, a controller may be associated with a single LED and include a transmitter that transmits a signal in response to a single light-sensing LED detecting a blocked condition. Also, for example, a controller may be associated with a grouping of LEDs and include a transmitter that transmits a signal in response to one or more of the grouping of LEDs detecting a blocked condition. Such transmitted signal may be sent over a network and may optionally be addressable to one or more light-generating LEDs. The signal may include, for example, a signal sent over a control wire and/or wireless communication signals (e.g., utilizing DMX, Ethernet, Bluetooth, ZigBee, and/or Z-Wave communication protocols). In some embodiments a controller may transmit a signal indicating a blocked condition of a first light-sensing LED utilizing coded LED light output of a second light-sensing LED that is not in a blocked condition.

Other LEDs besides those that are partially or fully covered by the object 5 may also sense they are in a partially blocked condition. For example, LEDs 31 and/or 32 may sense a diminished level of light output as a result of object 5. For example, some light output from LED 20E, generally indicated by reference numeral β, may be partially or fully blocked by the object 5 from reaching the LED 32. In response to LED 32 sensing it is receiving less light than expected (for example, because of light output β being blocked), one or more controllers may communicate with one or more LEDs of upper surface of LEDs 20 to request altered light output characteristics directed toward LED 32. For example, a controller associated with LED 32 may request additional light output from LED 20B. Optionally, if geometry data is available, a controller may take the direction of the fully blocked light-sensing LEDs into account when requesting additional light output. For example, the controller associated with LED 32 may recognize that the blocking of light output is coming from the direction of object 5 as a result of significantly diminished light output levels of light-sensing LEDs under the object 5. Accordingly, additional light output may be requested from LEDs that are in a direction generally away from the object 5 (e.g., LEDs 20A and/or 20B).

In some embodiments, a controller associated with LED 32 may be configured to expect light output sensed by LED 32 to be at a certain value or within a certain range of values. If the controller determines the light output sensed by LED 32 is not within that range, then it may request additional light output from one or more light-generating LEDs that provide some light output that influences the light output sensed at LED 32 to thereby cause the sensed light output at LED 32 to be within the expected range. In some embodiments a controller associated with LED 32 may be configured to calculate expected light output that should be sensed by LED 32 given the current illumination configuration of the light-generating LEDs if the object 5 were not present and to request additional light output toward LED 32 if such expected light output is not achieved. For example, if only LEDs 20D and 20E were lighting at a full level, it may be expected that LED 32 would sense a first light output level if no objects were present. When the object 5 is present, LED 32 may sense less than the first light output level. In response, a controller associated with LED 32 may request increased light output (e.g., by activating LED 20B) to bring the sensed light output at LED 32 to approximately the first light output level.

FIG. 2 illustrates the LED-based lighting system 10 of FIG. 1 with the object 5 removed. The light-generating LED 20C is generating a light output of a level less than full light output, as generally indicated by the light gray shading of the LED 20C in FIG. 2. The other LEDs in the upper surface of LEDs 20 are all off, as generally indicated by the black shading of the LEDs. The LEDs in the lower surface of LEDs 30 are acting as light-sensing LEDs. Some light output from light-generating LED 20C, generally indicated by reference numeral 21C, is illustrated in FIG. 2 as being directed toward light-sensing LED 32. As described herein, light output of LED 20C will also be directed toward other light-sensing LEDs on the lower surface of LEDs 30.

A calibration of the lighting system 10 may be performed. In some embodiments, the calibration may be performed when no foreign objects are present, such as shown in FIG. 2. In one embodiment, during the calibration LEDs are switched on one at a time (for example, LED 20C is the sole LED illuminated in FIG. 2), and the effect (difference in light intensity) can be measured by the light-sensing LEDs of the lower surface of LEDs 30 as the LEDs are sequentially activated. Because the light-sensing LEDs may only measure a part of the spectrum of the emitted light, the measured value may need to be multiplied with a factor that depends on the light output properties of the light emitting LED and/or the sensing properties of the light-sensing LED. The relation between the light-generating LEDs and the light-sensing LEDs can be generally quantified as the maximum amount of Lux that the light-generating LED can generate on the light-sensing LED.

This calibration can optionally be performed without a user noticing. For example, by having imperceptibly short intervals where only a single LED generates a very short flash of light while the other LEDs are off and in a sensing mode. Due to the shortness of the flash interval, a stable lighting situation is assumed. The contribution of the single light-generating LED on the light-sensing LEDs is measured as a delta in the interval. This information is an input for the determination of an influence matrix between the LEDs. In many embodiments, when performing a calibration, it is desirable that no foreign objects be present because of the influence they may have on the measurements.

FIG. 2A illustrates the effect of light output from certain LEDs of the upper surface 20 on certain LEDs of the lower surface 30. The relation between certain light emitting LEDs and light-sensing LEDs are illustrated as an influence matrix in FIG. 2A. The influence matrix may optionally be stored in an alternative format in memory associated with one or more controllers of the lighting system (e.g., as a lookup table). The thick arrows in FIG. 2A indicate the primary influencing light emitting LED effecting a light-sensing LED and the dashed arrows indicate lesser influencing LEDs effecting a light-sensing LED. For example, light-generating LED 20B is the primary influencing LED of light-sensing LED 32. Light-generating LEDs 20A and 20C influence the light-sensing LED 32 to a lesser extent. In some embodiments light-sensing LEDs may not be associated with a light-generating LED unless the light-generating LED has at least a threshold influence on such light-sensing LED. It is understood that the LEDs illustrated in FIGS. 2A-D may be associated with other LEDs than those illustrated in the influence matrices—the influence matrices are provided only as an example of some possible relations.

In FIG. 2B certain LEDs of the lower surface of LEDs have been illuminated during the calibration phase to determine the effect of light output from those LEDs on other upper and lower surface LEDs. As described herein, in certain implementations it may be desirable for one or more of the LEDs of the lower surface of LEDs 30 to additionally operate as light-generating LEDs and/or for one or more of the LEDs of the upper surface of LEDs 20 to additionally operate as light-sensing LEDs. As illustrated in FIG. 2B, when LED 31 is illuminated it has an effect on LEDs 20A, 20B, and 32. Also, when LED 32 is illuminated it has an effect on LEDs 20A, 20B, and 31. LEDs 31 and 32 are shown as having an effect on certain LEDs of the upper surface and lower surface of the LED-based lighting system of FIG. 1.

In FIG. 2C the relation between LEDs and influencing LEDs is illustrated. The Figure illustrates which of LEDs 20A-D are influential for LEDs 31-34. This relation can be found in some embodiments by taking the inverse relation of FIG. 2A. By using this relation, the system can immediately address the influencing LED, when an object blocks a sensing LED of the lower surface 30. For example, when an object blocks LED 32, it can immediately be derived that LED 20B has a big influence, and 20A and 20C have a smaller influence. Thus, to light up the object blocking LED 32, at least LED 20B can be used.

FIG. 2D illustrates the relation between LED 32 and certain of its influencing LEDs. The influence matrix of FIG. 2D includes directional information and specific intensity information. The intensity relation from LEDs 20A and 20C is indicated as 2, the intensity from LED 20B is indicated as 6, and the intensity from LED 20D on LED 32 is indicated as 0.2. The directional information indicates that the light from LED 20A on LED 32 is coming from the west, the direction from 20B on LED 32 is indicated as top, and the direction from LEDS 20C and 20D is indicated as east. Intensity information may be determined, for example, by measuring the relative Lux sensed as a result of illumination of an LED. Directional information may be determined, for example, via a CAD model interfacing with the system, via one or more location measurements (ultrasound, Ultra Wideband, camera detection), via one or more user inputs via a user interface, and/or via comparative analysis of the relative Lux at known neighboring LEDs. The intensity information and/or directional information may be utilized in directing light output. For example, it may be desirable to provide light output on an object that comes from a "top" direction only for a desired lighting effect. Also, for example, it may be desirable to provide light output on an object that comes from "surrounding" directions only. Also, for example, it may be desirable to provide relatively low levels of illumination on an object without having to adjust the light output level of LEDs, and only those LEDs that provide low levels of intensity at a location of the object may be utilized. Although only the relationship between certain LEDs are illustrated in FIGS. 2A-2D it is understood that relationships between additional LEDs of the system may be similarly determined and that the illustrated LEDs may have relationships that are in addition to those illustrated.

When direct communication between LEDs is available (e.g., a wireless or bus topology networks), every individual LED acting as a sensor may include a controller and can ask its influencing LED(s) to provide light output and no central controller is necessary. The system may work as a neural network where inputs directly influence the output. It is also possible to place intermediate nodes between the sensing LEDs and light-generating LEDs, to simplify the communication and controllability of the system. It is also possible that the sensing LEDs send all data to a central controller, or a controller that is responsible for a part of the area surrounding the LEDs. This controller will then request light output at the area by communicating to the influencing LEDs or to a controller that controls the influencing LEDs.

Certain LEDs may generate light some of the time or even a vast majority of the time and also have light-sensing capabilities. For example, certain LEDs can have imperceptibly small intervals where no light is emitted, thereby making it possible to sense light during those intervals. During such intervals the LEDs may detect that all light is blocked because an object is placed on top or that light is partially blocked. In such a case, a controller associated with the LED can ask influencing LEDs to provide light output on the object. In some embodiments, if a controller associated with the LED determines the LED is blocked, it can decide to switch the LED off and to have the LED enter a continuous sensing mode. The controller will then be able to detect when the object is removed from atop the LED, and stop asking the influencing LEDs for light on the location at such a time.

Figure 3:
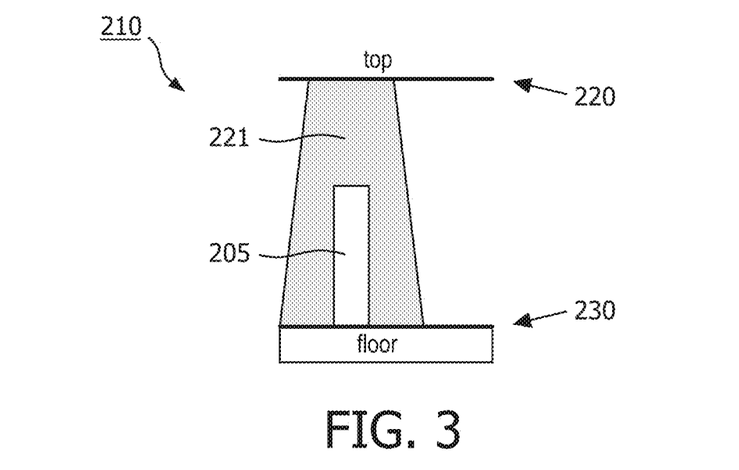
FIG. 3 illustrates a second embodiment of a LED-based lighting system having an upper surface of LEDs and a lower surface of LEDs; an object is illustrated atop a portion of the lower surface of LEDs and a light output is illustrated extending from the upper surface of LEDs.
Figure 3A:
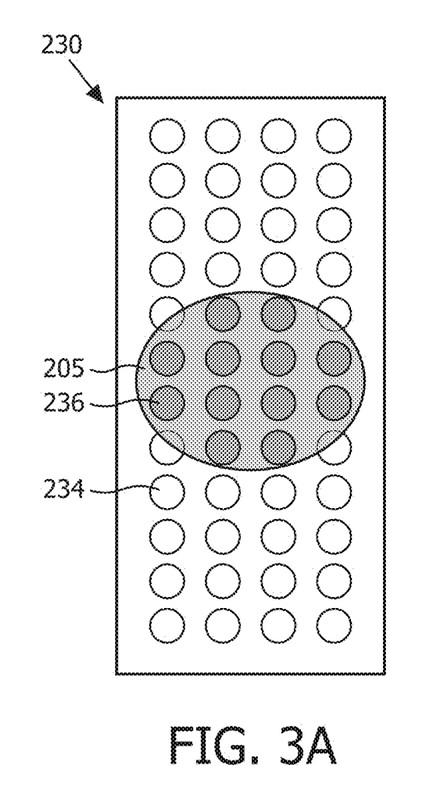
FIG. 3A illustrates a top view of the lower surface of LEDs of FIG. 3 with the object illustrated in the same position as it is in FIG. 3; LEDs that are located below the object are viewable in FIG. 3A for illustrative purposes.

FIG. 3 illustrates a second embodiment of a LED-based lighting system 210 having an upper surface of LEDs 220 and a lower surface of LEDs 230. An object 205 is illustrated atop a portion of the lower surface of LEDs 230. A light output 221 is illustrated extending from the upper surface of LEDs 220. FIG. 3A illustrates a top view of the lower surface of LEDs 230 of FIG. 3 with the object 205 illustrated in the same position as it is in FIG. 3. LEDs that are located below the object (e.g. LED 236) are viewable in FIG. 3A for illustrative purposes. The LEDs in the lower surface of LEDs 230 that are illustrated with black shading are those that are sensing a blocked condition. The LEDs in the lower surface of LEDs 230 that are illustrated without shading (e.g., LED 234) are those that are not sensing a blocked condition (but optionally still be in a sensing mode). As described herein, one or more controllers associated with the LEDs of lower surface of LEDs 230 that are under the object 205 may request that one or more influencing LEDs be illuminated to provide lighting on the object 205.

Figure 3B:
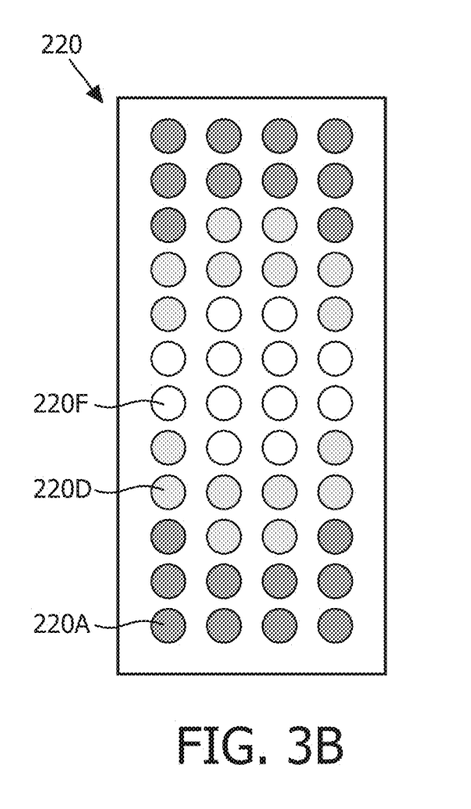
FIG. 3B illustrates a bottom view of the upper surface of LEDs of FIG. 3 with certain LEDs illuminated.

FIG. 3B illustrates a bottom view of the upper surface of LEDs of FIG. 3 with certain LEDs illuminated. The LEDs in the upper surface of LEDs 220 that are illustrated with black shading (e.g., LED 220A) are those that are not generating a light output. The LEDs in the upper surface of LEDs that are illustrated with light gray shading (e.g., LED 220D) are those that are generating a light output of a level less than full light output. The LEDs in the upper surface of LEDs that are illustrated without shading (e.g., LED 220F) are those that are generating a light output level that is approximately full light output. The LEDs without shading may be those that provide the most influence to the LEDs of lower surface of LEDs 230 that are under the object 205 during calibration. The LEDs with light gray shading may be those that provide light output of at least a predetermined level to the LEDs of lower surface of LEDs 230 that are under the object 205 during calibration. The LEDs with black shading may be those that provide no or minimal light output to the LEDs of lower surface of LEDs 230 that are under the object 205 when those LEDs during calibration. Collectively, the illuminated LEDs of upper surface 220 provide a light output 221 on the object 205 that illuminates the object 205.

Figure 4:
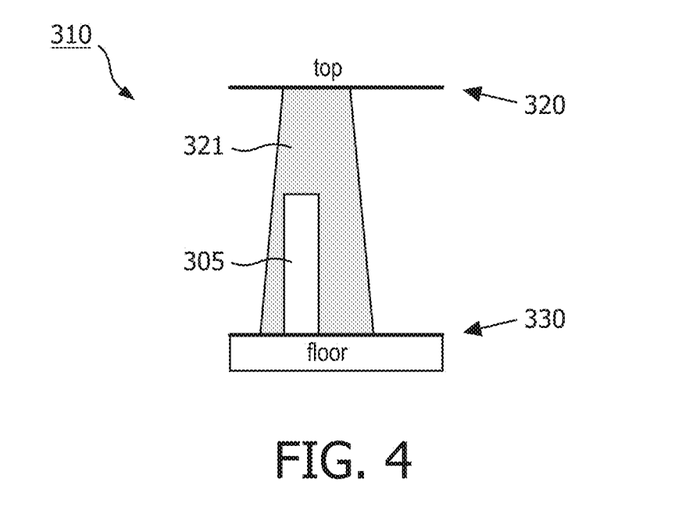
FIG. 4 illustrates a third embodiment of a LED-based lighting system having an upper surface of LEDs and a lower surface of LEDs; an object is illustrated atop a portion of the lower surface of LEDs and a light output is illustrated extending from the upper surface of LEDs.

FIG. 4 illustrates a third embodiment of a LED-based lighting system 310 having an upper surface of LEDs 320 and a lower surface of LEDs 330. An object 305 is illustrated atop a portion of the lower surface of the LEDs 330 and a light output 321 is illustrated extending from the upper surface of LEDs 320.

Figure 4A:
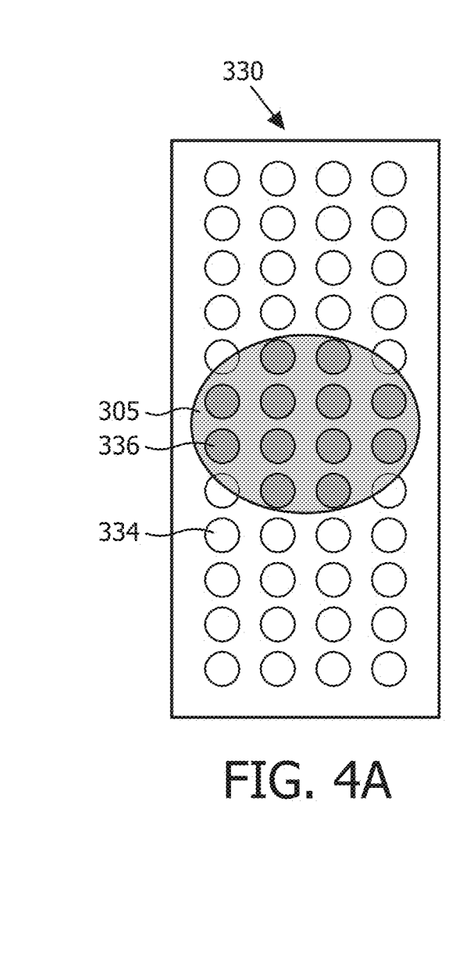
FIG. 4A illustrates a top view of the lower surface of LEDs of FIG. 4 with the object illustrated in the same position as it is in FIG. 4; LEDs that are located below the object are viewable in FIG. 4A for illustrative purposes.

FIG. 4A illustrates a top view of the lower surface of LEDs 330 of FIG. 4 with the object 305 illustrated in the same position as it is in FIG. 4. LEDs that are located below the object (e.g. LED 336) are viewable in FIG. 4A for illustrative purposes. The LEDs in the lower surface of LEDs 330 that are illustrated with black shading are those that are sensing a blocked condition. The LEDs in the lower surface of LEDs that are illustrated without shading (e.g., LED 334) are those that are not sensing a blocked condition. As described herein, one or more controllers associated with the LEDs of lower surface of LEDs 330 that are under the object 305 may request that one or more influencing LEDs be illuminated to provide lighting on the object 305.

Figure 4B:
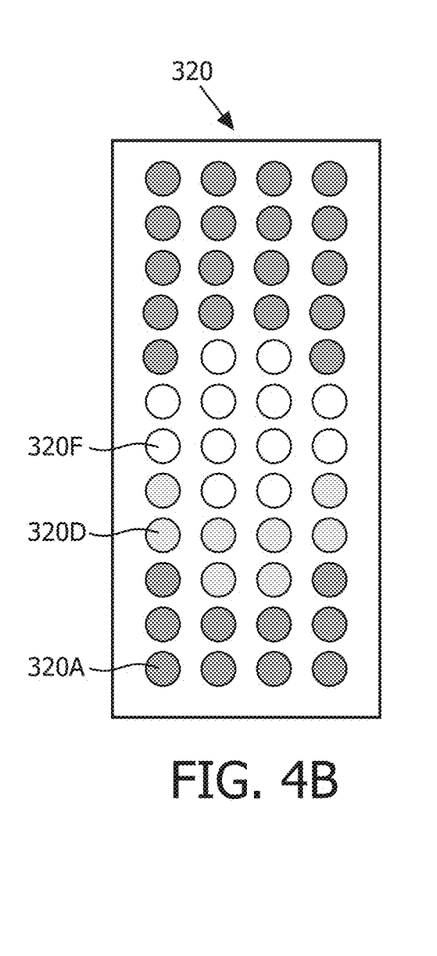
FIG. 4B illustrates a bottom view of the upper surface of LEDs of FIG. 4 with certain LEDs illuminated in a first configuration.
Figure 4C:
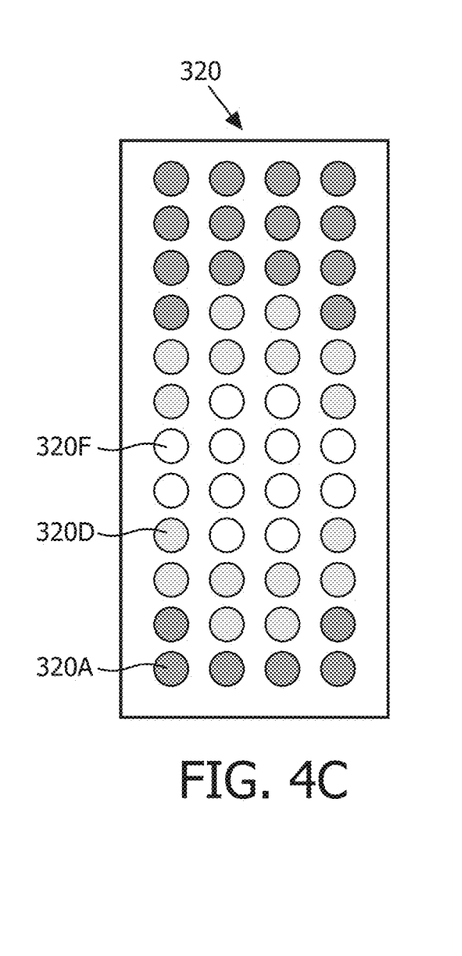
FIG. 4C illustrates a bottom view of the upper surface of LEDs of FIG. 4 with certain LEDs illuminated in a second configuration.

FIG. 4B illustrates a bottom view of the upper surface of LEDs of FIG. 4 with certain LEDs illuminated in a first configuration. FIG. 4C illustrates a bottom view of the upper surface of LEDs of FIG. 4 with certain LEDs illuminated in a second configuration. The LEDs in the upper surface of LEDs 320 that are illustrated with black shading (e.g., LED 320A) are those that are not generating a light output. The LEDs in the upper surface of LEDs that are illustrated with light gray shading (e.g., LED 320D) are those that are generating a light output of a level less than full light output. The LEDs in the upper surface of LEDs that are illustrated without shading (e.g., LED 320F) are those that are generating a light output level that is approximately full light output.

In the lighting configurations of FIGS. 4A and 4B, directional data between the LEDs is available and utilized in determining which LEDs in the upper surface of LEDs 330 to illuminate. A direction configuration parameter is associated with the light-sensing LEDs that are covered by the object 305 to indicate a preference direction for the influencing light provided from LEDs of the upper surface 330. Thus, the directional configuration will be utilized by the controller(s) associated light-sensing LEDs that are covered by the object 305 to request light output from LEDs of upper surface of LEDs 320 that match the direction parameter to light up the environment. In the first configuration of FIG. 4B, the directional configuration dictates that LEDs which would mainly illuminate behind the object 305 should not be activated. In the second configuration of FIG. 4C, an alternative directional configuration dictates that the activated LEDs should be shifted away from the object 305 slightly in a first direction (e.g., in a direction toward the front of a shelf). One of ordinary skill in the art, having had the benefit of the present disclosure, will recognize and appreciate that in alternative embodiments other directional configurations may be associated with one or more light-sensing LEDs.

Figure 5:
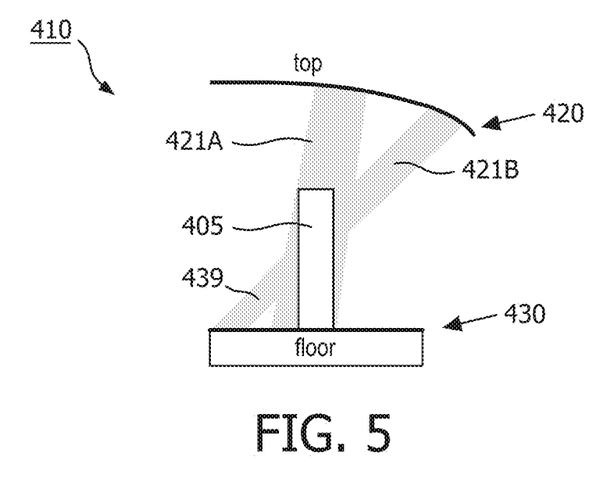
FIG. 5 illustrates a fourth embodiment of a LED-based lighting system having an upper surface of LEDs and a lower surface of LEDs; an object is illustrated atop a portion of the lower surface of the LEDs and a light output is illustrated extending from the upper surface of LEDs.

FIG. 5 illustrates a fourth embodiment of a LED-based lighting system 410 having an arcuate upper surface of LEDs 420 and a lower surface of LEDs 430. An object 405 is illustrated atop a portion of the lower surface of the LEDs 430. A light output is directed generally at the object having a first upper light output component 421A and a second upper light output component 421B extending from the upper surface of LEDs 420.

Figure 5A:
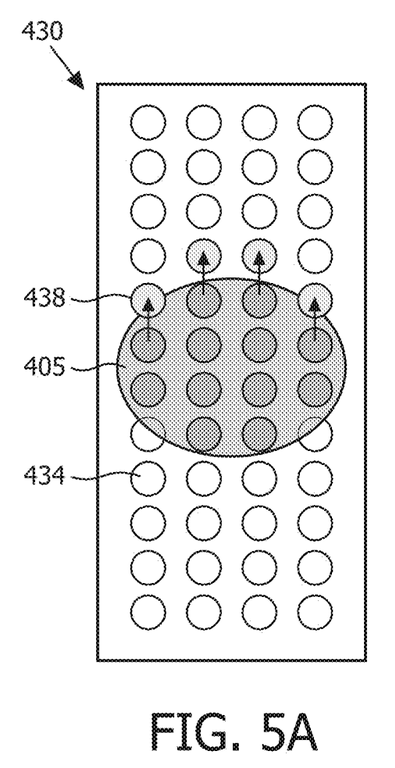
FIG. 5A illustrates a top view of the lower surface of LEDs of FIG. 5 with the object illustrated in the same position as it is in FIG. 5; LEDs that are located below the object are illustrated in FIG. 5A for illustrative purposes; certain LEDs of the lower surface of LEDs are illuminated.

FIG. 5A illustrates a top view of the lower surface of LEDs 430 of FIG. 5 with the object 405 illustrated in the same position as it is in FIG. 5. The LEDs in the lower surface of LEDs 430 that are illustrated with black shading are those that are sensing a blocked condition. They have requested light from a certain direction, which results in light beam 421A. The LEDs in the lower surface of LEDs 430 that are illustrated without shading (e.g., LED 434) are those that are not sensing a blocked condition. The LEDs in the lower surface of LEDs that are illustrated with light gray shading (e.g., LED 438) are neighbor LEDs of the blocked LEDs (located in the opposite direction) and are mainly influenced by those upper surface LEDs that are generating light output 421B. As described herein, one or more controllers associated with the LEDs of lower surface of LEDs 430 that are under the object 405 may request that one or more influencing LED be illuminated to provide lighting on the object 405. This request can also be forwarded to LEDs in the opposite direction (LEDs 438), so they ask for more light from their influential LEDs with the requested direction which results in light beam 421B. In some embodiments intensity data from a calibration may additionally or alternatively be utilized.

Figure 5B:
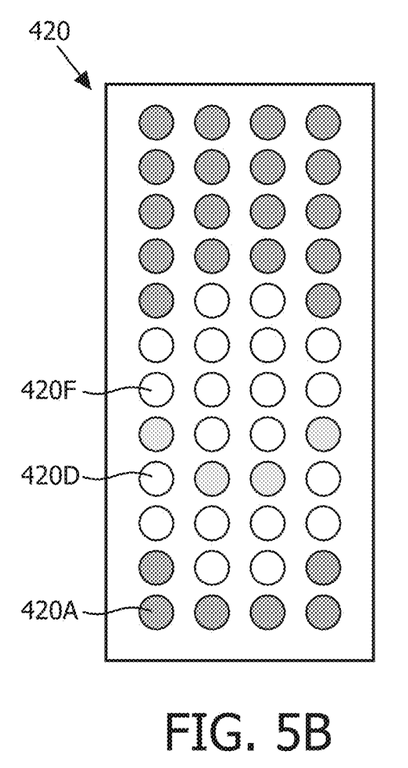
FIG. 5B illustrates a bottom view of the upper surface of LEDs of FIG. 5 with certain LEDs illuminated.

FIG. 5B illustrates a bottom view of the upper surface of LEDs 420 of FIG. 5 with certain LEDs illuminated. The LEDs in the upper surface of LEDs 420 that are illustrated with black shading (e.g., LED 420A) are those that are not generating a light output. The LEDs in the upper surface of LEDs that are illustrated with light gray shading (e.g., LED 420D) are those that are generating a light output of a level less than full light output. The LEDs in the upper surface of LEDs that are illustrated without shading (e.g., LED 420F) are those that are generating a light output level that is approximately full light output. In the illustrated lighting configuration of the upper surface of LEDs 420, two components of light output 421A and 421B are provided (indicated by the no shading LED groupings—the upper grouping corresponding to light output 421A and the lower grouping corresponding to light output 421B), with more subtle lighting provided therebetween (indicated by the light gray shading LED grouping). Light output 421A is generated on request of the blocked LEDs (light from a requested direction) while light output 421B is requested by the neighbors of the blocked LEDs.

Figure 6:
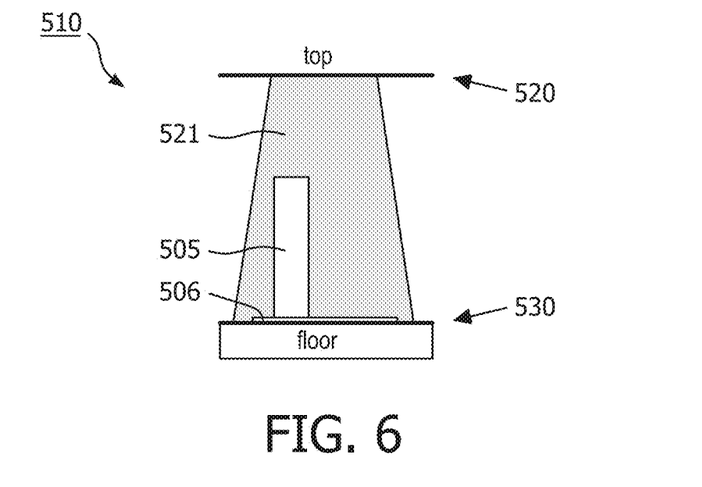
FIG. 6 illustrates a fifth embodiment of a LED-based lighting system having an upper surface of LEDs and a lower surface of LEDs; an object is illustrated atop a mat that is provided over a portion of the lower surface of the LEDs and a light output is illustrated extending from the upper surface of LEDs.

FIG. 6 illustrates a fifth embodiment of a LED-based lighting system 510 having an upper surface of LEDs 520 and a lower surface of LEDs 530. An object 505 is illustrated atop a mat 506 that is provided over a portion of the lower surface of LEDs 530 and a light output 521 is illustrated extending from the upper surface of LEDs 520. The mat 506 is used to get extra light in a desired surrounding area of the object (e.g., toward the front of a shelf). By selecting a desired shape and/or size of mat and/or cutting the mat, the light effect can be broadened and controlled as desired by a user.

When geometry data is available, it may be known for a given LED what LEDs neighbor that LED. Such information may be used by the system, for example, to determine if a partially blocked condition at a LED is due to an object being placed on an adjacent LED; to cause neighboring LEDs of blocked LEDs to emit light to create a light effect around an object; and/or certain LEDs may be grouped together.

Optionally, when all LEDs in a lighting system, or all LEDs in a grouping of LEDs receive some light, the system itself can conclude that no object is placed on the surface and the conditions for performing a calibration are met. The system itself can decide to execute a calibration with a user approving or noticing this.

The apparatus and methods described herein may be utilized in various configurations where a multitude of LEDs are applied. For example, in some implementations aspects of the LED lighting system may be implemented in shelving in a retail environment. Also, for example, in some implementations aspects of the LED lighting system may be implemented in wallpaper with embedded LEDs. For example, the LEDs in the wallpaper may detect if a picture or other object is placed on or close to the wall.

Also, for example, in some implementations aspects of the LED lighting system may be implemented in a floor. For example, the locations of mannequins (optionally on a solid base or mat) can be detected on a floor, and a lighting infrastructure with redirectable spots can be controlled to put light on the mannequin location (or higher) to illuminate the mannequin. When the mannequin is moved, the light effect can follow. One or more sensing LEDs in the invention may also optionally be replaced by light sensors that cannot emit light.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Also, reference numerals appearing between parentheses in the claims are provided merely for convenience and should not be construed as limiting the claims in any way.

What is claimed is:

1. A method, comprising:
    activating each of a plurality of light-generating LEDs in a calibration mode;
    measuring a light intensity at each of a plurality of light-sensing nodes during said calibration mode to determine a light intensity contribution of each of said light-generating LEDs at each of said light-sensing nodes;
    monitoring said light intensity at each of said plurality of light-sensing nodes during an active mode;
    detecting a blocked condition at a blocked node of said light-sensing nodes when said light intensity at said blocked node is below a threshold level in said active mode; and
    activating at least one of the light-generating LED in response to detecting said blocked condition, wherein said activated at least one light-generating LED provides at least a minimum light intensity contribution of said light intensity contribution at said blocked node during said calibration mode.

2. The method of claim 1 wherein said blocked node includes at least one light-sensing LED.

3. The method of claim 2 wherein said blocked node includes a plurality of said light-sensing LEDs.

4. The method of claim 2, further comprising selectively generating a light output with said light-sensing LED when said light-sensing LED is not in said blocked condition.

5. The method of claim 1 wherein the step of activating each of said plurality of light-generating LEDs in a calibration mode includes sequentially activating each of said light-generating LEDs.

6. The method of claim 1 wherein said blocked node includes at least one of said light-generating LEDs.

7. The method of claim 6 wherein said light-generating LED of said blocked node does not generate a light output when in said blocked condition.

8. The method of claim 1, wherein at least one of the plurality of light-generating LEDs is disposed at a first surface, and at least one of the plurality of light-sensing nodes is disposed at a second surface separated and spaced apart from the first surface.

9. The method of claim 1, wherein the plurality of light-generating LEDs are disposed at a first surface, and the plurality of light-sensing nodes are disposed at a second surface separated and spaced apart from the first surface.

10. A method, comprising:
    associating directional information and intensity information of a plurality of light-generating LEDs with a plurality of light-sensing nodes;
    associating a directional parameter with each of said light-sensing nodes;
    monitoring a light intensity at each of said light-sensing nodes;
    detecting a blocked condition at a blocked node of said light-sensing nodes when said light intensity is below a threshold level at said blocked node; and
    activating, in response to said blocked condition, at least one of said light-generating LEDs associated with said blocked node that has said directional information corresponding to said directional parameter of said blocked node.

11. The method of claim 10 wherein said blocked node includes at least one light-sensing LED.

12. The method of claim 10 wherein only those said light-generating LEDs that have said directional information corresponding to said directional parameter of said blocked node are activated in response to said blocked condition.

13. The method of claim 10, wherein associating directional information and intensity information of a plurality of light-generating LEDs with a plurality of light-sensing nodes comprises:
    activating each of the plurality of light-generating LEDs in a calibration mode; and
    measuring a light intensity at each of a plurality of light-sensing nodes during said calibration mode.

14. The method of claim 10, wherein at least one of the plurality of light-generating LEDs is disposed at a first surface, and at least one of the plurality of light-sensing nodes is disposed at a second surface separated and spaced apart from the first surface.

15. A network of LEDs, comprising:
    a plurality of networked LEDs;
    said networked LEDs including a first LED configured to selectively generate a light output therefrom and a second LED configured to selectively sense a light intensity level thereat;
    wherein said light output of said first LED affects said light intensity at said second LED when no obstructions are present therebetween;
    wherein said first LED is illuminating in the direction of said second LED in response to said second LED sensing said light intensity level thereat below a threshold value.

16. The network of claim 15 wherein said second LED is additionally configured to selectively generate a second light output therefrom, wherein said first LED is additionally configured to sense a second light intensity level thereat, and wherein said second light output of said second LED affects said second light intensity at said first LED when no obstructions are present therebetween.

17. The network of claim 15 wherein said first LED is on a first surface and said second LED is either on a second surface facing said first surface, or is also on said first surface.

18. The apparatus of claim 15, wherein the first LED is on a first surface and the second LED is either on a second surface separated and spaced apart from the first surface.

19. The apparatus of claim 15, wherein the networked LEDs include:
    a plurality of light-emitting LEDs disposed at a first surface and configured to selectively generate a light output therefrom; and a plurality of light-sensing LEDs disposed at a second surface and configured to sense a light intensity level thereat, wherein the second surface is separated and spaced apart from the first surface.

20. The apparatus of claim 15, further comprising at least one controller, wherein the controller is connected with the plurality of networked LEDs via a network, wherein at least some of the networked LEDs are individually addressable by the controller, and wherein the controller is configured to signal the first LED via the network to increase its light output directed toward the second LED in response to the second LED sensing the light intensity level thereat below the threshold value.

* * * * *